(No Model.) 2 Sheets—Sheet 2.
C. FOX.
REVOLVING HARROW.
No. 415,813. Patented Nov. 26, 1889.
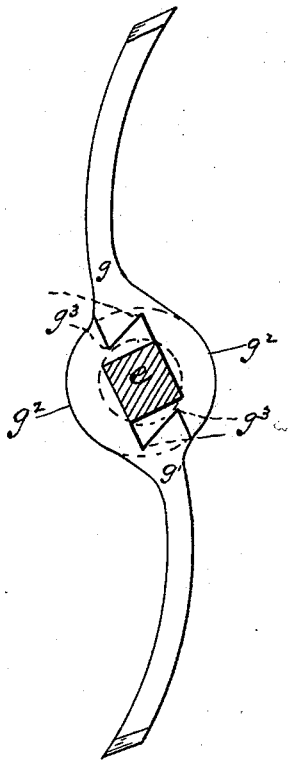
WITNESSES: INVENTOR:
Alfred Gartner Charles Fox,
E. L. Sherman
BY Drake & Co, ATTY'S.

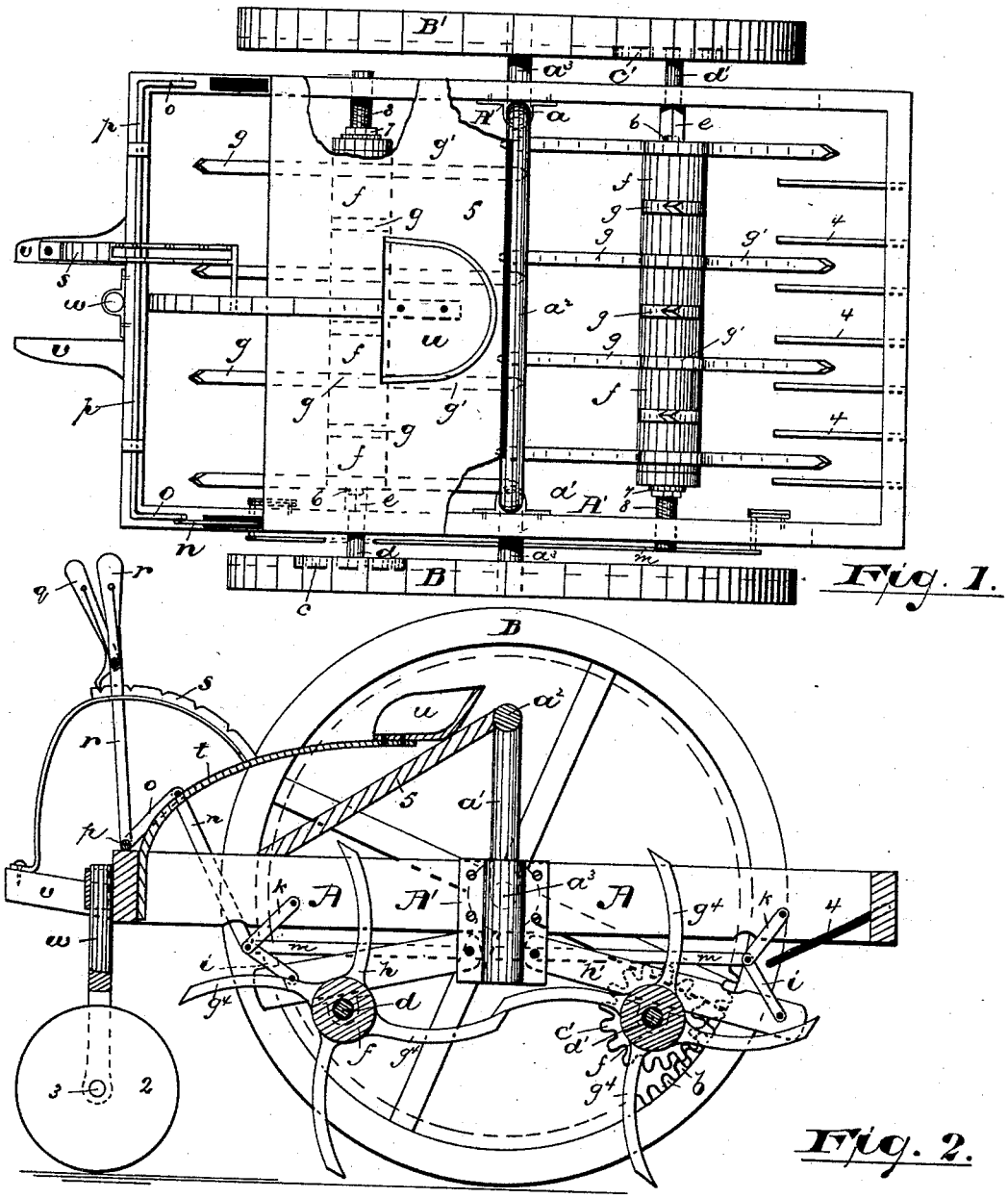

UNITED STATES PATENT OFFICE.

CHARLES FOX, OF NEWARK, NEW JERSEY.

REVOLVING HARROW.

SPECIFICATION forming part of Letters Patent No. 415,813, dated November 26, 1889.

Application filed May 10, 1889. Serial No. 310,252. (No model.)

*To all whom it may concern:*

Be it known that I, CHARLES FOX, a citizen of the United States, residing at Newark, in the county of Essex and State of New Jersey, have invented certain new and useful Improvements in Revolving Harrows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to effectually and completely break up and pulverize the earth after it has been plowed and to level it for sowing or planting or for plowing when the soil is light, and by a simple, expeditious, and economical device.

The invention consists in the improved rotary harrow and clod-breaker and the combination and arrangement of parts thereof, substantially as will be hereinafter more fully set forth and finally embodied in the claims.

Referring to the accompanying drawings, in which like letters of reference indicate corresponding parts in each of the several figures, Figure 1 is a top plan view of a rotary harrow embodying my improvement, the adjusting mechanism being shown on one side only. Fig. 2 is a longitudinal central section of the same. Fig. 3 is a plan view of one of the teeth-carrying shafts; and Fig. 4 is an enlarged view of a double tooth, the shaft being shown in section.

In said drawings, A represents the frame of the machine, having bearings in or near its longitudinal center, in which are fixed the ends of a shaft $a$. This shaft is formed in the shape of an upwardly-extending yoke, the upward portions $a'$ being held firmly in an upright position by the collars or steadying-supports A', rigidly secured to the frame A. The cross-piece of this yoke-shaft is shown at $a^2$, Fig. 1. The ends of this yoke-shaft project out of and beyond the frame, as shown at $a^3$, so as to form bearings for driving-wheels B B'. Upon the inner side of the periphery of the wheels B B', and occupying the space between the spokes and the inner edges, are gear-teeth $b$. (Shown in Fig. 2.) Into these gear-teeth mesh tooth-pinions $c\ c'$, the pinion $c$ meshing into teeth on wheel B and pinion $c'$ into teeth on wheel B', as will be understood from the drawings. These pinions are firmly secured on rotating shafts $d\ d'$, the pinion $c$ being secured to shaft $d$ and pinion $c'$ to shaft $d'$, as shown in Fig. 1. That portion of the shafts $d\ d'$ within the frame is preferably made rectangular, as shown at $e$, Fig. 4. Upon this rectangular portion of the shafts $d$ $d'$ are fitted collars or sleeves $f\ f$, varying in length according to the number of harrow-teeth to be employed. Upon the shafts $d\ d'$, and between the ends of the sleeves or collars, are secured and fitted harrow-teeth formed in two parts $g\ g'$, as shown on Fig. 4. The shanks of these teeth are formed with an outward curve corresponding to the curve of the sleeves $f$, as shown at $g^2$, and on their inside with rectangular slots to rest on the shafts $d\ d'$, and with dovetail slots and projections to lock the two teeth firmly together, as shown at $g^3$, Fig. 4. These teeth between their sharp ends and the shanks are curved in a forward direction, as shown at $g^4$, Fig. 2.

The shafts $d\ d'$ revolve in bearings secured, respectively, to frames $h\ h'$, pivoted at one end to the frame A, as shown in Fig. 2. To the outer end of the frames $h\ h'$ are pivoted one end of arms $i\ i$, the other end of said arms being pivoted to one end of arms $k\ k$, the other end of said arms $k\ k$ being pivoted to the frame A, as shown in Fig. 2. The arms $k\ k$ and $i\ i$ are connected together at their pivotal connections by longitudinal connecting-rods $m\ m$, the forward ends of said connecting-rods $m$ being pivotally connected to one end of connecting-rods $n\ n$, the other ends being pivotally connected to upward extensions $o\ o$ of a cross bar or rod $p$, Fig. 1. Rigidly secured to the bar or rod $p$ is a hand operating-lever $r$, (shown in Fig. 2,) and provided at its upper portion with a hand spring-detent $q$, to engage in slots in a quadrant $s$. This quadrant $s$ is slotted, as shown in Fig. 1, to receive the lever $r$, and is secured at its forward end to a projection $v$ on the frame A, and at the other end to a spring extension-frame $t$, carrying a seat $u$. The projections $v\ v$ are arranged and adapted to receive a cross-bar or whiffletrees for attaching an animal to the harrow, as may be desired. To the forward end of the frame A, and preferably between the projections v v, is secured a vertical bearing, in which turns the upper end of upright shaft w, the lower end of said shaft being slotted to receive a guiding and supporting wheel 2, revolving on a pin 3, secured in the lower end of said slot, as shown in Fig. 2. In the rear of the frame A, and projecting inwardly and downwardly, are rigidly secured rods 4 4, so arranged upon the frame that each harrow-tooth on the rear shaft d' shall pass between two of said rods, as shown in Fig. 1. To prevent the loosened and pulverized earth from being thrown up against the driver, a board 5 is arranged under the seat, as shown in Figs. 1 and 2.

Upon the ends of the shafts d d' toward the pinion are pins 6 6, against which the outer teeth rest, and upon the other ends of said shafts are threaded nuts 7 7, turned on the threaded portion 8 8 of said shafts, so that when said nuts are firmly secured up against the adjacent sleeve all the teeth are securely held in position on the shaft. By loosening the nut the sleeves are loosened on the shaft, and can be moved longitudinally, so as to allow the unlocking of the two portions of a tooth and remove and replace it at pleasure. By moving the hand-lever the shafts d d' can be adjusted to the desired depth of soil to harrow or break up. When the lever is in the position shown in Fig. 2, the ends of the harrow-teeth will be approximately on a line with the surface of the ground, and when the lever is brought forward toward the driver the shafts d d' will be depressed, thus forcing the teeth deeper into the ground in the course of their revolution.

The teeth on the shafts d and d' are so arranged with respect to each other that the points of each tooth on one shaft shall pass between the points of two teeth on the other shaft, as shown in Fig. 1.

Having thus described my invention, what I claim as new, and desire to secure by Letters Patent, is—

1. The improved rotary harrow, in which each tooth-bearing shaft is driven independently by direct contact with two driving-wheels, respectively, the construction consisting, essentially, of a frame, a bearing-shaft projected at each side of the frame to form a bearing for supporting-wheels, the supporting-wheels B B', provided with the internal gear-teeth, two teeth-bearing shafts d d, revolved in bearings on said frame, the ends of the shafts d d' projecting, respectively, at the opposite sides of the frame and being provided, respectively, at their outer ends with the pinions c c', meshing independently with the internal teeth of the driving-wheels B and B', as and for the purpose set forth.

2. In a rotary harrow, a tooth-bearing shaft having rectangular surface between its bearings in the frame and provided with adjustable and removable harrow-teeth separated by removable sleeves or collars, said teeth being held in position on said shaft by dovetailed shank ends, the shank end of one tooth fitting into the dovetailed shank end of the corresponding tooth, as described, and for the purpose set forth.

In testimony that I claim the foregoing I have hereunto set my hand this 27th day of April, 1889.

CHARLES FOX.

Witnesses:
ALFRED GARTNER,
E. L. SHERMAN.